Dec. 19, 1922.
J. E. GENN.
CONTROL BOARD FOR MOTOR VEHICLES.
ORIGINAL FILED AUG. 16, 1918.
1,439,511.
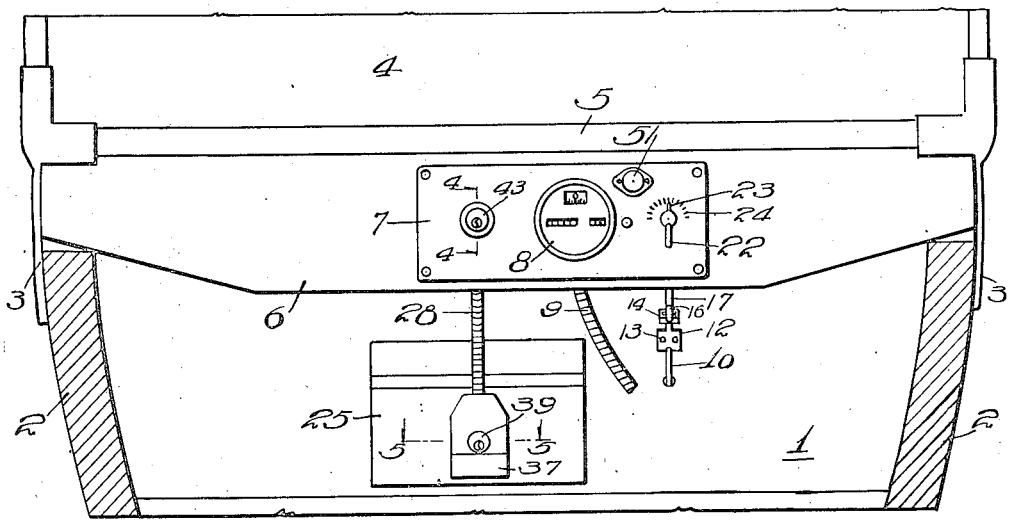

Patented Dec. 19, 1922.

1,439,511

UNITED STATES PATENT OFFICE.

JOHN E. GENN, OF CHICAGO, ILLINOIS, ASSIGNOR TO STEWART-WARNER SPEEDOMETER CORPORATION, OF CHICAGO, ILLINOIS, A CORPORATION OF VIRGINIA.

CONTROL BOARD FOR MOTOR VEHICLES.

Application filed August 16, 1918, Serial No. 250,121. Renewed November 13, 1920. Serial No. 423,981.

*To all whom it may concern:*

Be it known that I, JOHN E. GENN, a citizen of the United States, residing at the city of Chicago, in the county of Cook and the State of Illinois, have invented certain new and useful Improvements in Control Boards for Motor Vehicles, of which the following is a specification, reference being had to the accompanying drawings, forming a part thereof.

This invention is directed to a control board for motor vehicles designed to provide an assembled arrangement of indicating and control devices such as a speedometer, an ignition switch lock and a carbureter adjustment. It consists in the features and elements and their combination hereinafter described and shown in the drawings as indicated by the claims.

In the drawings:

Figure 1 is a transverse vertical sectional view of a part of an automobile body being taken just rearwardly of the windshield and the cowl and illustrating a control board embodying this invention installed in said body.

Figure 2 is a perspective detail view partly in section showing a universal joint connection between the control board and the carbureter adjustment originally provided in the vehicle.

Figure 3 is a detail section taken as indicated at line 3—3 on Figure 2.

Figure 4 is a detail section of the control board taken as indicated at line 4—4 on Figure 1.

Figure 5 is a detail section of the terminal block on the ignition coil box taken as indicated at line 5—5 on Figure 1.

Figure 6 is a detail section taken at line 6—6 on Figure 5.

Figure 7 is a detail section illustrating a modification of the locking device for the terminal block cover.

Figures 8 and 9 are respectively transverse vertical sections taken through the cover of the terminal block and showing the arrangement of said block and circuit wires connected thereto.

Figure 10 is a partial rear elevation of the control board showing the mounting of the ignition switch thereon.

The control board which is the subject of this invention is designed primarily for use on the standard Ford automobile in which the engine compartment under the hood is divided from the driver's compartment in the body by a vertical wall, 1, and the space immediately rearward of this wall is hooded by a cowl connected to the sides, 2, of the body at 3, 3, and supporting a windshield, 4, whose lower edge formed by the member, 5, is positioned at some distance above the top edges of the body sides, 2, thus providing a convenient position for an instrument board on which a speedometer and other devices may be mounted. For this purpose the present invention supplies a wooden panel, 6, to which there is preferably applied a metallic plate, 7, on which there are assembled and secured several devices concerned with the control of the vehicle. One of these is a speedometer indicated at 8, and provided with the usual flexible drive shaft, 9, leading from the rear side of the board, 6, and adapted for connection with one of the road wheels in a familiar manner which need not be further described.

A regular feature of the Ford automobile is the carbureter adjustment member, a rod, 10, which projects obliquely through the partition, 1, and terminates in a bent eye, 11, serving as a handle by which the rod, 10, may be rotated for altering the carbureter adjustment. To render this operation more convenient there is provided a universal coupling device consisting of a clamp member, 12, whose jaws are secured to opposite sides of the flat eye, 11, by means of a clamping bolt, 13, and which is at its opposite end pivotally attached to a square block or frame, 14, carried by transverse pivots, 15, in a yoke, 16, of a torsion link, 17. The opposite end of the link, 17, is formed with a second yoke, 18, similarly engaging a second frame, 19, in which a transverse pivot, 20, connects with the end of a short shaft, 21, extending through the control board to the face side thereof where it is fitted with a handle, 22, having an index member, 23, arranged to traverse a segmental index dial, 24, formed directly on the plate, 7. Thus the carbureter adjustment may be made easily by angular adjustment of the handle on the control board instead of in the relatively difficult and awkward manner necessitated by the location of the original handle, 11.

In the standard arrangement, the ignition coil is carried in a box, 25, mounted on the vertical wall 1, and the face of this box carries a control switch usually arranged for actuation by insertion of a key. The operation of this switch is also made more convenient by removing the switch casing, 26, from its original location on the coil box, 25, and remounting it on the rear side of the control board, 7, where it is held in place by a bracket, 27. Said bracket is in the form of a strap whose ends are secured to the rear face of the control board by screws, 27ª, while the bolts, 27ᵇ, engaging two of three original apertures, 26ᵇ, in the back plate, 26ª, of the switch box, serve to hold the latter to the bracket, 27. Inside the switch box posts, 26ᶜ, connect the back plate with the front wall, and recesses, 6ᵈ, are formed in the control board to accommodate the heads of the srews, 26ᵈ, by which said parts are held together. A flexible conduit, 28, is provided for the three wires required to connect the switch with the proper terminals on the coil box, 25, and the upper end of said conduit, 28, is suspended by a clip, 29, extending from the bracket, 27, while its lower end is provided with another clip, 30, which is in fact a plate, secured to the face of the coil box, 25, by three bolts, 31, as seen in Figure 9. Secured to the plate, 30, the block, 32, of wood or other insulating material is provided with three binding screws, 33, by which the terminals of the three connecting wires in the conduit, 28, are connected to the terminals of the original three wires, 34, leading from the coil box, 25.

Two of the bolts, 31, are provided with grooved heads for engaging notches, 35, in a rotatable lock member, 36, carried on the cover, 37, which is provided for enclosing the terminal block and its connection on the coil box. The lock member is pivoted at its mid point to a bridge member, 38, permanently fixed in the cover, 37, and is arranged for rotation into or out of connection with the grooved heads of the bolts, 31, by means of a lock, 39, of the Yale or Corbin type, having a lug, 40, arranged to engage a pin, 41, on the lock arm, 36, as seen in Figures 5 and 6. For operating the electric switch contained in the casing, 26, a similar lock, 43, is set in the metal panel, 7, of the control board, being provided with an extension arm, 44, by which its rotatable barrel is connected with the rotary member of the switch in the casing, 26. Preferably the lock, 43, and the lock, 39, will be operable by the same key; but, whether the same or different keys are used for these locks, it will be noted that the switch and electrical connections are at all times under lock and key so that the vehicle may be safely left standing if the switch is left open and locked in this position.

As a modification of the locking device for the cover, 37, a somewhat similar expedient may be employed in accordance with details shown in Figure 7, in which 45 represents a modified form of the bolt, 31, having a larger head drilled and tapped to receive a flanged screw, 46, whose square head, 47, is engageable by means of a small pocket wrench, 48, which would enter the casing, 37, through a special aperture, 49, provided for that purpose. The two bolts adjacent opposite sides of the cover, 37, being provided with locking screws, 46, of this design, and the casing having inturned slotted lugs, 50, instead of the ridge members, 38, in pivoted locking bar, 36, it will be evident that by loosening the screws, 46, by means of the socket wrench, 48, a slight sliding movement either up or down as the case may be according to the direction of the notches in the lugs, 50, will release the cover from the locking key.

To complete the assembly a hooded electric lamp may be furnished at 51, as shown in Figure 1, for illuminating both the speedometer dial and the dial, 24, provided for the carbureter adjustment device, and it will be seen that with this arrangement, the convenience of manipulation of the various devices is greatly increased over that afforded by their original location at considerably lower positions on the partition wall, 1, where it is necessary for the driver to lean over in an awkward position to reach them. It is also evident that the assembly of the devices on the single control panel notably enhances their attractiveness.

I claim:

1. In a motor vehicle having a front wall for the driver's compartment with an ignition control switch originally carried by said wall and an engine adjusting member extending through said wall and provided with a handle adjacent the same, a control board mounted in a plane substantially nearer the driver's seat and within easy reach therefrom, means for securing said ignition switch to said board and electrical connecting means extending therefrom to the original location of the switch on said wall; and mechanical connections from the engine adjusting handle to said control board including a handle movably mounted on the face of said board for manipulation of such adjusting member.

2. In a motor vehicle having a front wall for the driver's compartment with an ignition coil box mounted on said wall, an ignition switch housed in a casing originally attached to said box, a control board mounted in a plane substantially nearer the driver's seat and within easy reach therefrom, means for securing said switch casing to the rear side of said control board in registration with an access aperture therein, and a conduit and electrical conductors in said conduit connecting the switch with the coil box.

3. In a motor vehicle having a front wall for the driver's compartment with an ignition coil box mounted on said wall, an ignition switch housed in a casing originally attached to said box, a control board mounted in a plane substantially nearer the driver's seat and within easy reach therefrom, means for securing said switch casing to the control board, wires extending through the wall of the coil box for connection with the switch, a terminal block adapted for securement on the box in the original location of said switch casing and provided with binding screws for said wires, and auxiliary connecting wires leading from the switch and secured respectively by said binding screws of the terminal block.

4. In combination with the structure set out in claim 3, a conduit for said auxiliary wires, a cover for the terminal block communicating with said conduit and means for locking said cover over the block and the wires leading thereto.

5. In a motor vehicle having a front wall for the driver's compartment and an engine adjusting member extending through said wall and formed with an eye adapted to serve as a handle for rotating said member, a control board mounted in a plane substantially nearer the driver's seat than said compartment wall, a clamp secured to said eye of the adjusting member, a torsion link and a control handle rotatively mounted on the face of said control board together with universal points at opposite ends of said torsion link connecting it to said clamp and to said control handle respectively.

In testimony whereof, I have hereunto set my hand at Chicago, Illinois, this 12th day of August, 1918.

J. E. GENN.